United States Patent
Park et al.

(10) Patent No.: US 8,300,522 B2
(45) Date of Patent: Oct. 30, 2012

(54) OFDM SIGNAL TRANSMISSION APPARATUS AND METHOD

(75) Inventors: Eui-jun Park, Seoul (KR); Ki-bo Kim, Hwaseong-si (KR); Jong-hun Kim, Suwon-si (KR); Se-jun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 12/601,758

(22) PCT Filed: Apr. 25, 2008

(86) PCT No.: PCT/KR2008/002317
§ 371 (c)(1),
(2), (4) Date: Nov. 24, 2009

(87) PCT Pub. No.: WO2008/147048
PCT Pub. Date: Dec. 4, 2008

(65) Prior Publication Data
US 2010/0177628 A1    Jul. 15, 2010

(30) Foreign Application Priority Data
Jun. 1, 2007   (KR) .................. 10-2007-0054101

(51) Int. Cl.
*H04J 11/00* (2006.01)
(52) U.S. Cl. ...................................................... 370/210
(58) Field of Classification Search .......... 370/203–210, 370/328–339, 470–474
See application file for complete search history.

(56) References Cited

U.S. PATENT DOCUMENTS

| | | | |
|---|---|---|---|
| 6,359,938 B1* | 3/2002 | Keevill et al. | 375/316 |
| 6,907,026 B2* | 6/2005 | Akiyama | 370/344 |
| 6,968,017 B2* | 11/2005 | Nielsen | 375/316 |
| 7,652,980 B2* | 1/2010 | Henriksson et al. | 370/208 |
| 2005/0141414 A1 | 6/2005 | Cheun et al. | |
| 2005/0233705 A1 | 10/2005 | Vare et al. | |
| 2006/0062314 A1* | 3/2006 | Palin et al. | 375/260 |
| 2009/0100651 A1* | 4/2009 | Naftalin et al. | 24/452 |
| 2009/0110092 A1* | 4/2009 | Taylor et al. | 375/260 |
| 2009/0129302 A1* | 5/2009 | Pekonen et al. | 370/311 |

FOREIGN PATENT DOCUMENTS
CN    1490949 A    4/2004

OTHER PUBLICATIONS

Choi et al, Design and Implementation of DVB-T Receiver System for Digital TV, IEEE, 8 pages, 2004.*

(Continued)

*Primary Examiner* — Frank Duong
(74) *Attorney, Agent, or Firm* — Sughrue Mion, PLLC

(57) ABSTRACT

An orthogonal frequency division multiplexing (OFDM) signal transmission apparatus and a method thereof are disclosed. The OFDM signal transmission apparatus includes an inverse Fourier transform (IFT) unit for transforming a frequency domain OFDM signal to a time domain OFDM signal according to one of transmission modes of 4K, 16K, and 32K; a guard interval inserting unit for inserting a guard interval into the transformed time domain OFDM signal according to a predetermined guard interval inserting rate; and a transmitting unit for transmitting the OFDM signal having the guard interval. Therefore, the data transmission rate is enhanced.

16 Claims, 2 Drawing Sheets

OTHER PUBLICATIONS

Schertz et al, Hierarchical Modulation—the transmission of two independent DVB-T multiplexes on a single frequency, EBU Technical Review, 13 pages, Apr. 2003.*
Lauterjung, DVB-T, the new terrestrial TV standard, News from Rohde & Schwarz No. 155 (1997/III), 2 pages, 1997.*
Drommydas et al, An Efficient Memory Compression Scheme for 8k FFT in a DVB-T Receiver and the Corresponding Error Model, IEEE, 4 pages, 2004.*

Communication dated Mar. 22, 2012 from the State Intellectual Property Office of P.R. China in counterpart Chinese application No. 200880013065.2.
ETSI EN 300 744 V1.5.1, "Digital Video Broadcasting(DVB); Framing structure, channel coding and modulation for digital terrestrial television," Nov. 30, 2004.

* cited by examiner

OFDM SIGNAL TRANSMISSION APPARATUS AND METHOD

TECHNICAL FIELD

The present invention relates to an orthogonal frequency division multiplexing (OFDM) signal transmission apparatus, and a method thereof, and more particularly to an OFDM signal transmission apparatus in which the data transmission rate is enhanced when a digital broadcast is transmitted, and a method thereof.

BACKGROUND OF THE INVENTION

Digital Video Broadcasting-Terrestrial (DVB-T) standard adopted for terrestrial digital broadcasting in Europe uses an orthogonal frequency division multiplexing (OFDM) technique.

OFDM is a type of multi carrier modulation, and has superior performance in both multi-path and portable receiving environments. Therefore, the OFDM has been noted as a modulation method appropriate for terrestrial digital television and digital audio broadcasting.

OFDM has mainly been researched in the field of communication, but research has been conducted in the field of broadcasting since the OFDM has been adopted by the European Broadcasting Union (EBU) as a digital audio broadcasting system modulation method.

An OFDM transmission signal is generated by combining a plurality of digital modulation waves. The respective carrier wave modulation uses quadrature phase-shift keying (QPSK) for audio broadcasting, and a multi-level modulation such as 64 Quadrature amplitude modulation (QAM) for terrestrial digital TV broadcasting.

When OFDM is used for transmitting data, the basic unit is a symbol. Each symbol includes a valid symbol interval and a guard interval (GI). The valid symbol interval is used to transmit data, and the guard interval is required to reduce interference between multi-path channels.

If the guard interval is long enough, the interference between the multi-path channels is reduced. As data are not transmitted within the guard interval, if the proportion of the guard interval in each symbol is larger than that of the valid symbol interval, the loss of data rate increases.

The length of the guard interval should be maintained to conform to the channel environment in order to alleviate the deterioration in the data transmission rate caused by the use of the guard interval.

SUMMARY OF THE INVENTION

Exemplary embodiments of the present invention provide an apparatus for transmitting an orthogonal frequency division multiplexing (OFDM) signal, in which the ratio of the guard interval in the data is lowered by reducing the size of the fast Fourier transform/inverse fast Fourier transform (FFT/IFFT) so that the data transmission rate is enhanced, and a method thereof.

According to an exemplary aspect of the present invention, there is provided an orthogonal frequency division multiplexing (OFDM) signal transmission apparatus, the apparatus including an inverse Fourier transform (IFT) unit for transforming a frequency domain OFDM signal to a time domain OFDM signal according to one of transmission modes of 4K, 16K, and 32K; a guard interval inserting unit for inserting a guard interval into the transformed time domain OFDM signal according to a predetermined guard interval inserting rate; and a transmitting unit for transmitting the OFDM signal having the guard interval.

The IFT unit may perform an IFT on the frequency domain OFDM signal using an IFT coefficient according to one of the transmission modes of 4K, 16K, and 32K.

If the transmission mode is 4K, the IFT coefficient is 4*1024, if the transmission mode is 16K, the IFT coefficient is 16*1024, and if the transmission mode is 32K, the IFT coefficient is 32*1024.

The guard interval inserting rate may be one of ¼, ⅛, 1/16, 1/32, and 1/64.

If the transmission mode is 4K, the IFT unit may process a frequency domain OFDM signal using 1705*2 carriers, if the transmission mode is 16K, the IFT unit may process a frequency domain OFDM signal using 6817*2 carriers, and if the transmission mode is 32K, the IFT unit may process a frequency domain OFDM signal using 6817*4 carriers.

If a bandwidth of 8 MHz is used, and the transmission mode is 4K, the IFT unit processes the frequency domain OFDM signal so that the symbol duration is 224*2 µs, if a bandwidth of 8 MHz is used, and the transmission mode is 16K, the IFT unit processes the frequency domain OFDM signal so that the symbol duration is 896*2 µs, and if a bandwidth of 8 MHz is used, and the transmission mode is 32K, the IFT unit processes the frequency domain OFDM signal so that the symbol duration is 896*4 µs.

If a bandwidth of 6 MHz is used, and the transmission mode is 4K, the IFT unit processes the frequency domain OFDM signal so that the symbol duration is 298.667*2 µs, if a bandwidth of 6 MHz is used, and the transmission mode is 16K, the IFT unit processes the frequency domain OFDM signal so that the symbol duration is 1194.667*2 µs, and if a bandwidth of 6 MHz is used, and the transmission mode is 32K, the IFT unit processes the frequency domain OFDM signal so that the symbol duration is 1194.667*4 µs.

If a bandwidth of 7 MHz is used, and the transmission mode is 4K, the IFT unit processes the frequency domain OFDM signal so that the symbol duration is 256*2 µs, if a bandwidth of 7 MHz is used, and the transmission mode is 16K, the IFT unit processes the frequency domain OFDM signal so that the symbol duration is 1024*2 µs, and if a bandwidth of 7 MHz is used, and the transmission mode is 32K, the IFT unit processes the frequency domain OFDM signal so that the symbol duration is 1024*4 µs.

The apparatus may further include a digital-to-analog converter (DAC) for converting an OFDM signal having the guard interval output from the guard interval inserting unit into an analog signal.

According to another exemplary embodiment of the present invention, there is provided a method for transmitting an orthogonal frequency division multiplexing (OFDM) signal, the method including transforming a frequency domain OFDM signal to a time domain OFDM signal according to one of transmission modes of 4K, 16K, and 32K; inserting a guard interval into the transformed time domain OFDM signal according to a predetermined guard interval inserting rate; and transmitting the OFDM signal having the guard interval.

The transforming may perform an IFT on the frequency domain OFDM signal using an IFT coefficient according to one of the transmission modes of 4K, 16K, and 32K.

If the transmission mode is 4K, the IFT coefficient is 4*1024, if the transmission mode is 16K, the IFT coefficient is 16*1024, and if the transmission mode is 32K, the IFT coefficient is 32*1024.

The guard interval inserting rate may be one of ¼, ⅛, 1/16, 1/32, and 1/64.

If the transmission mode is 4K, the transforming may include processing a frequency domain OFDM signal using 1705*2 carriers, if the transmission mode is 16K, the transforming may include processing a frequency domain OFDM signal using 6817*2 carriers, and if the transmission mode is 32K, the transforming may include processing a frequency domain OFDM signal using 6817*4 carriers.

If a bandwidth of 8 MHz is used, and the transmission mode is 4K, the transforming may include processing the frequency domain OFDM signal so that the symbol duration is 224*2 μs, if a bandwidth of 8 MHz is used, and the transmission mode is 16K, the transforming may include processing the frequency domain OFDM signal so that the symbol duration is 896*2 μs, and if a bandwidth of 8 MHz is used, and the transmission mode is 32K, the transforming may include processing the frequency domain OFDM signal so that the symbol duration is 896*4 μs.

If a bandwidth of 6 MHz is used, and the transmission mode is 4K, the transforming may include processing the frequency domain OFDM signal so that the symbol duration is 298.667*2 μs, if a bandwidth of 6 MHz is used, and the transmission mode is 16K, the transforming may include processing the frequency domain OFDM signal so that the symbol duration is 1194.667*2 μs, and if a bandwidth of 6 MHz is used, and the transmission mode is 32K, the transforming may include processing the frequency domain OFDM signal so that the symbol duration is 1194.667*4 μs.

If a bandwidth of 7 MHz is used, and the transmission mode is 4K, the transforming may include processing the frequency domain OFDM signal so that the symbol duration is 256*2 μs, if a bandwidth of 7 MHz is used, and the transmission mode is 16K, the transforming may include processing the frequency domain OFDM signal so that the symbol duration is 1024*2 μs, and if a bandwidth of 7 MHz is used, and the transmission mode is 32K, the transforming may include processing the frequency domain OFDM signal so that the symbol duration is 1024*4 μs.

The method may further include converting an OFDM signal having the guard interval output from the guard interval inserting unit into an analog signal.

The OFDM signal transmission apparatus according to an exemplary embodiment of the present invention can enhance the data transmission rate by increasing the FFT/IFFT size, and reducing the ratio of the guard interval in data. Moreover, compatibility with a transmitter adopted by related art systems such as a DVB-T standard is maintained.

DETAILED DESCRIPTION OF EXEMPLARY EMBODIMENTS OF THE INVENTION

Figure 1:
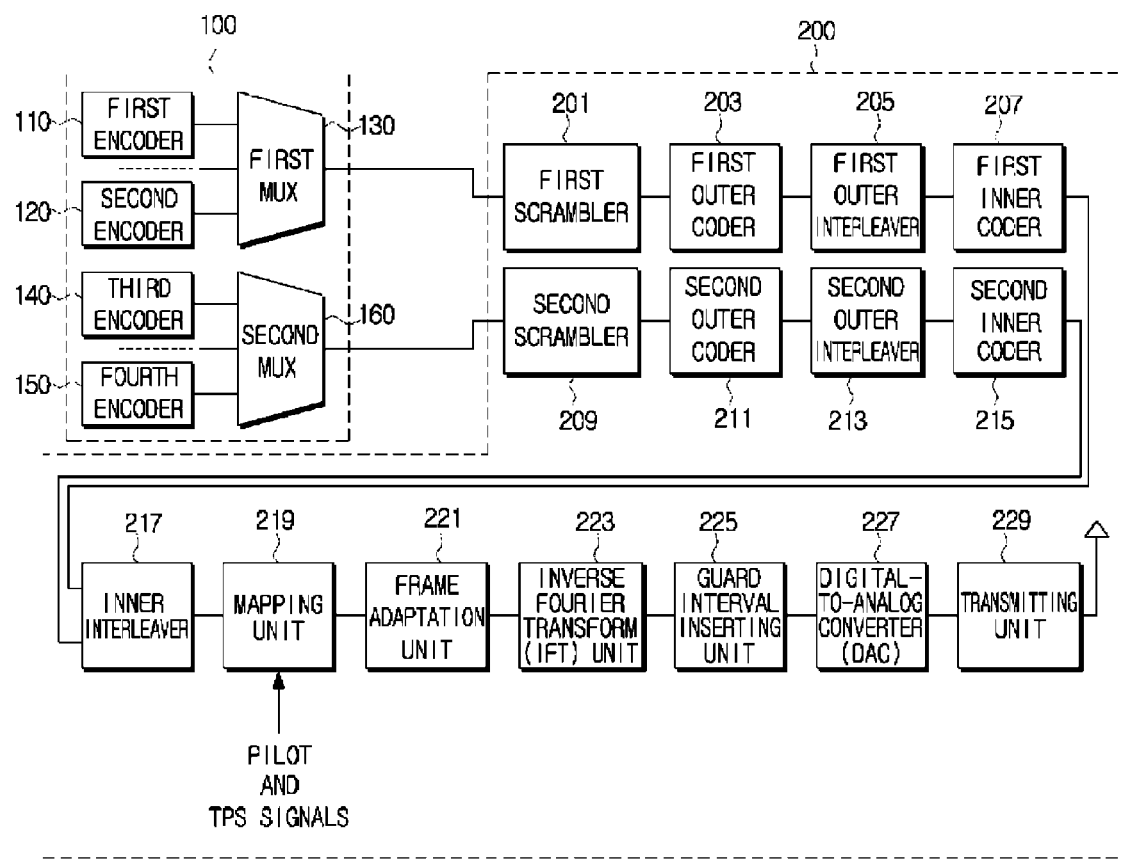
FIG. 1 is a block diagram illustrating an OFDM signal transmission apparatus according to an exemplary embodiment of the present invention.

The following are descriptions of various elements of the drawings.
- 100: transport stream generating unit 200: transport stream processing unit
- 201: first scrambler 203: first outer coder
- 205: first outer interleaver 207: first inner coder
- 209: second scrambler 211: second outer coder
- 213: second outer interleaver 215: second inner coder
- 217: inner interleaver 219: mapping unit
- 221: frame adaptation unit 223: inverse Fourier transform (IFT) unit
- 225: guard interval inserting unit 227: digital-to-analog converter (DAC)
- 229: transmitting unit Best Mode for Carrying Out the Invention The present invention will be explained in detail with reference to the drawings.

FIG. 1 is a block diagram illustrating an orthogonal frequency division multiplexing (OFDM) signal transmission apparatus according to an exemplary embodiment of the present invention.

Referring to FIG. 1, an OFDM signal transmission apparatus according to an exemplary embodiment of the present invention may include a transport stream generating unit 100 and a transport stream processing unit 200.

The transport stream generating unit 100 may include a first encoder 110, a second encoder 120, a first multiplexer (MUX) 130, a third encoder 140, a fourth encoder 150, and a second multiplexer (MUX) 160.

The OFDM transmission apparatus according to an exemplary embodiment of the present invention uses the Digital Video Broadcasting-Terrestrial (DVB-T) standard, and thus uses hierarchical modulation.

Hierarchical modulation is used to reduce interference caused by multiple paths, and causes data loss to be minimized by modulating a stream transmitted at a high hierarchal level to a low hierarchal level. The stream allotted to a low hierarchal level may be transmitted well during bad weather, whereas the amount of information to be transmitted through the stream is reduced. In this exemplary embodiment of the present invention, a stream modulated to a high hierarchal level is referred to as a high priority (HP) stream, and a stream modulated to a low hierarchal level is referred to as a low priority (LP) stream.

The first encoder 110 and the second encoder 120 encode an HP stream, and the first MUX 130 multiplexes the respective HP streams encoded by the first and second encoders 110 and 120.

The third encoder 140 and the fourth encoder 150 encode an LP stream, and the second MUX 160 multiplexes the respective LP streams encoded by the third and the fourth encoders 140 and 150.

Receivers may receive both an HP stream and an LP stream, or may receive an HP stream. The HP and LP streams may contain data related to the same content or different content.

The transport stream processing unit 200 may include a first scrambler 201, a first outer coder 203, a first outer interleaver 205, a first inner coder 207, a second scrambler 209, a second outer coder 211, a second outer interleaver 213, a second inner coder 215, an inner interleaver 217, a mapping unit 219, a frame adaptation unit 221, an inverse Fourier transform (IFT) unit 223, a guard interval inserting unit 225, a digital-to-analog converter (DAC) 227, and a transmitting unit 229.

The first scrambler 201 scrambles an HP stream input by the first MUX 130. The scrambling represents randomizing a stream in order to prevent a synchronization signal from being lost due to reiteration of the same bits.

The first outer coder 203 encodes a scrambled HP stream. The first outer coder 203 may use a Reed-Solomon code.

The first outer interleaver 205 interleaves the HP stream encoded by the first outer coder 203. The first outer interleaver 205 may use convolutional interleaving.

The first inner coder 207 encodes the HP stream interleaved by the first outer interleaver 205. The first inner coder 207 may use a punctured convolutional code.

The second scrambler 209, the second outer coder 211, the second outer interleaver 213, and the second inner coder 215 perform the same function as the first scrambler 201, the first outer coder 203, the first outer interleaver 205, and the first inner coder 207, respectively. The second scrambler 209, the second outer coder 211, the second outer interleaver 213, and the second inner coder 215 process an LP stream.

The inner interleaver 217 receives the HP stream and the LP stream from the first inner coder 207 and the second inner coder 215, respectively, and interleaves the received HP and LP streams.

The mapping unit 219 inserts a pilot signal and a transmission parameter signaling (TPS) signal into the inner-interleaved transport stream, and maps the stream including the pilot and TPS signals. The pilot signal is used so that a receiver may estimate channels in a frequency domain and a time domain. The TPS signal includes information regarding the length of the guard interval, or transfer parameters such as the modulation or coding rate, and is used so the receiver can quickly receive a signal.

The frame adaptation unit 221 forms a frame of a transport stream output from the mapping unit 219. The frame includes a continual pilot, a scattered pilot, a transmission parameter signaling (TPS) carrier, and data. The position of the pilots within the frame may be changed according to the symbol.

The IFT unit 223 receives a transport stream from the frame adaptation unit 221, and performs an IFT on the transport stream. The transport stream input to the IFT unit 223 is a frequency domain OFDM signal, and the frequency domain OFDM signal is converted into a time domain OFDM signal by performing an IFT. While the IFT unit 223 according to an exemplary embodiment of the present invention performs an IFT, the IFT unit 223 may alternatively perform an inverse fast Fourier transform (IFFT).

The IFT unit 223 transforms a frequency domain OFDM signal into a time domain OFDM signal according to one of transmission modes of 4K, 16K, and 32K. Specifically, the IFT unit 223 uses an IFT coefficient according to one of the transmission modes of 4K, 16K, and 32K to transform a frequency domain OFDM signal into a time domain OFDM signal.

If the IFT unit 223 uses a transmission mode of 4K, the IFT coefficient may be 4*1024, if the IFT unit 223 uses a transmission mode of 16K, the IFT coefficient may be 16*1024, and if the IFT unit 223 uses a transmission mode of 32K, the IFT coefficient may be 32*1024.

According to this exemplary embodiment of the present invention, the transmission modes of 4K, 16K, and 32K are used to perform an IFT so as to provide discrete Fourier transform or inverse discrete Fourier transform (DFT/IDFT) applying a transmission mode of greater than 2K or 8K, which a predefined DVB-T standard adopts.

When a transmission mode which the predefined DVB-T standard adopts is used, the IFT coefficient of a transmission mode of 2K is 2*1024, and the IFT coefficient of a transmission mode of 8K is 8*1024. It is recommended that the IFT coefficient be increased in order to enhance the data transmission rate.

This exemplary embodiment of the present invention uses a transmission mode twice as fast as the transmission mode adopted by the DVB-T standard in order to enhance the data transmission rate. The IFT unit 223 uses one of transmission modes of 4K, 16K, and 32K to perform the IFT, so that the data transmission rate is greater than that of the predefined DVB-T standard. The transmission mode of 16K is changed to a 32K transmission mode so that the data transmission rate is doubled.

When a bandwidth of 8 MHz is used, the IFT unit 223 processes a frequency domain OFDM signal according to the transmission mode. For example, if a transmission mode of 4K is used, the frequency domain OFDM signal is processed by 1705*2 carriers, if a transmission mode of 16K is used, the frequency domain OFDM signal is processed by 6817*2 carriers, and if a transmission mode of 32K is used, the frequency domain OFDM signal is processed by 6817*4 carriers.

If a transmission mode of 4K is used, the IFT unit 223 processes a frequency domain OFDM signal so that the symbol duration is 224*2 μs, if a transmission mode of 16K is used, the IFT unit 223 processes a frequency domain OFDM signal so that the symbol duration is 896*2 μs, and if a transmission mode of 32K is used, the IFT unit 223 processes a frequency domain OFDM signal so that the symbol duration is 896*4 μs. Table 1 shows parameters used when the IFT unit 223 transforms a frequency domain OFDM signal to a time domain OFDM signal. A bandwidth of 8 MHz is assumed.

TABLE 1

| Parameter | 4K | 16K | 32K |
| --- | --- | --- | --- |
| Number of carriers (K) | 1705 * 2 | 6817 * 2 | 6817 * 4 |
| Minimum value of carrier ($K_{min}$) | 0 | 0 | 0 |
| Maximum value of carrier ($K_{max}$) | 1705 * 2−1 | 6817 * 2−1 | 6817 * 4−1 |
| Symbol duration (Tu) | 224 * 2 μs | 896 * 2 μs | 896 * 4 μs |
| Carrier interval (1/Tu) | 4464/2 Hz | 1116/2 Hz | 1116/4 Hz |
| Interval between minimum and maximum values of carrier ((K−1)/Tu) | 7.61 MHz | 7.61 MHz | 7.61 MHz |

The guard interval inserting unit 225 inserts a guard interval into a time domain OFDM signal output from the IFT unit 223 according to a predetermined ratio. A guard interval signal is necessarily used to reduce interference between multi-path channels occurring on characteristic of OFDM.

The predefined DVB-T standard uses a guard interval inserting rate of ¼, ⅛, 1/16, or 1/32. However, as the symbol duration of a valid symbol interval according to an exemplary embodiment of the present invention is twice as fast as a transmission mode of 2K or 8K, the guard interval inserting rate may be ½ in order to operate without inter-symbol interference (ISI) occurring.

Accordingly, a guard interval inserting rate of 1/64 may also be used in addition to a guard interval inserting rate of ¼, ⅛, 1/16, or 1/32 adopted by the related art DVB-T standard. That is, guard interval inserting rates of ¼, ⅛, 1/16, 1/32, and 1/64 are used in this exemplary embodiment of the present invention. Table 2 summarizes the above information. A bandwidth of 8 MHz is assumed, and "T" represents bandwidth.

TABLE 2

| | Transmission mode | | | | | | | | | |
| --- | --- | --- | --- | --- | --- | --- | --- | --- | --- | --- |
| | 16K | | | | | 4K | | | | |
| GI rate | ¼ | ⅛ | 1/16 | 1/32 | 1/64 | ¼ | ⅛ | 1/16 | 1/32 | 1/64 |
| Data (Tu) | 16 * 1024 * T = 896 * 2 μs | | | | | 4 * 1024 * T = 224 * 2 μs | | | | |
| GI Δ | Tu/4 | Tu/8 | Tu/16 | Tu/32 | Tu/64 | Tu/4 | Tu/8 | Tu/16 | Tu/32 | Tu/64 |
| Symbol | Tu5/4 | Tu9/8 | Tu117/16 | Tu33/32 | Tu65/64 | Tu5/4 | Tu9/8 | Tu117/16 | Tu33/32 | Tu65/ |

TABLE 2-continued

| Transmission mode | |
|---|---|
| 16K | 4K |

| | |
|---|---|
| Ts = Δ + Tu | 64 |

The DAC 227 converts an OFDM signal to which a guard interval is inserted by the guard interval inserting unit 225 into an analog signal, and outputs the converted analog signal.

The transmitting unit 229 transmits the converted OFDM signal via an antenna. The transmitting unit 229 may include a filter (not shown) and a front end processor (not shown), which is well known to those skilled in the art, so a more detailed description is omitted here for the sake of brevity.

Tables 1 and 2 show parameters used when a bandwidth of 8 MHz is used to convert an OFDM signal, and parameters related to a guard interval inserting rate. The parameters may vary according to the bandwidth. Parameters used when bandwidths of 6 MHz and 7 MHz are used to convert an OFDM signal, and parameters related to a guard interval inserting rate are shown in Tables 3 to 6.

TABLE 3

| Parameter | 4K | 16K | 32K |
|---|---|---|---|
| Number of carriers (K) | 1705 * 2 | 6817 * 2 | 6817 * 4 |
| Minimum value of carrier ($K_{min}$) | 0 | 0 | 0 |
| Maximum value of carrier ($K_{max}$) | 1705 * 2−1 | 6817 * 2−1 | 6817 * 4−1 |
| Symbol duration (Tu) | 298.6667 * 2 μs | 1194.667 * 2 μs | 1194.667 * 4 μs |
| Carrier interval (1/Tu) | 3.348214/2 Hz | 0.837054/2 Hz | 0.837054/4 Hz |
| Interval between minimum and maximum values of carrier((K−1)/Tu) | 5.71 MHz | 5.71 MHz | 5.71 MHz |

Table 3 shows parameters used when converting an OFDM signal using a bandwidth of 6 MHz.

TABLE 4

| | Transmission mode | | | | | | | | | |
|---|---|---|---|---|---|---|---|---|---|---|
| | 16K | | | | | 4K | | | | |
| GI rate | ¼ | ⅛ | 1/16 | 1/32 | 1/64 | ¼ | ⅛ | 1/16 | 1/32 | 1/64 |
| Data (Tu) | 16 * 1024 * T = 1194.667 * 2 μs | | | | | 4 * 1024 * T = 298.667 * 2 μs | | | | |
| GI Δ | Tu/4 | Tu/8 | Tu/16 | Tu/32 | Tu/64 | Tu/4 | Tu/8 | Tu/16 | Tu/32 | Tu/64 |
| Symbol Ts = Δ + Tu | Tu5/4 | Tu9/8 | Tu117/16 | Tu33/32 | Tu65/64 | Tu5/4 | Tu9/8 | Tu117/16 | Tu33/32 | Tu65/64 |

Table 4 shows parameters related to a guard interval inserting rate when using a bandwidth of 6 MHz.

TABLE 5

| Parameter | 4K | 16K | 32K |
|---|---|---|---|
| Number of carriers (K) | 1705 * 2 | 6817 * 2 | 6817 * 4 |
| Minimum value of carrier ($K_{min}$) | 0 | 0 | 0 |
| Maximum value of carrier ($K_{max}$) | 1705 * 2−1 | 6817 * 2−1 | 6817 * 4−1 |
| Symbol duration (Tu) | 256 * 2 μs | 1024 * 2 μs | 1024 * 4 μs |
| Carrier interval (1/Tu) | 3.90625/2 Hz | 0.976563/2 Hz | 0.976563/4 Hz |
| Interval between minimum and maximum values of carrier((K−1)/Tu) | 6.66 MHz | 6.66 MHz | 6.66 MHz |

Table 5 shows parameters used when converting an OFDM signal using a bandwidth of 7 MHz.

TABLE 6

| | Transmission mode | | | | | | | | | |
|---|---|---|---|---|---|---|---|---|---|---|
| | 16K | | | | | 4K | | | | |
| GI rate | ¼ | ⅛ | 1/16 | 1/32 | 1/64 | ¼ | ⅛ | 1/16 | 1/32 | 1/64 |
| Data (Tu) | 16 * 1024 * T = 1024 * 2 μs | | | | | 4 * 1024 * T = 256 μs | | | | |
| GI Δ | Tu/4 | Tu/8 | Tu/16 | Tu/32 | Tu/64 | Tu/4 | Tu/8 | Tu/16 | Tu/32 | Tu/64 |

TABLE 6-continued

| | Transmission mode | | | | | | | | |
|---|---|---|---|---|---|---|---|---|---|
| | 16K | | | | 4K | | | | |
| Symbol Ts = Δ + Tu | Tu5/4 | Tu9/8 | Tu117/16 | Tu33/32 | Tu65/64 | Tu5/4 | Tu9/8 | Tu117/16 | Tu33/32 | Tu65/64 |

Table 6 shows parameters related to a guard interval inserting rate when using a bandwidth of 7 MHz.

Parameters used when the IFT unit 223 performs an IFT on an OFDM signal, and parameters related to a guard interval inserting rate used by the guard interval inserting unit 225, may be changed as shown in Tables 1 to 6 according to the bandwidth of each country.

Figure 2:
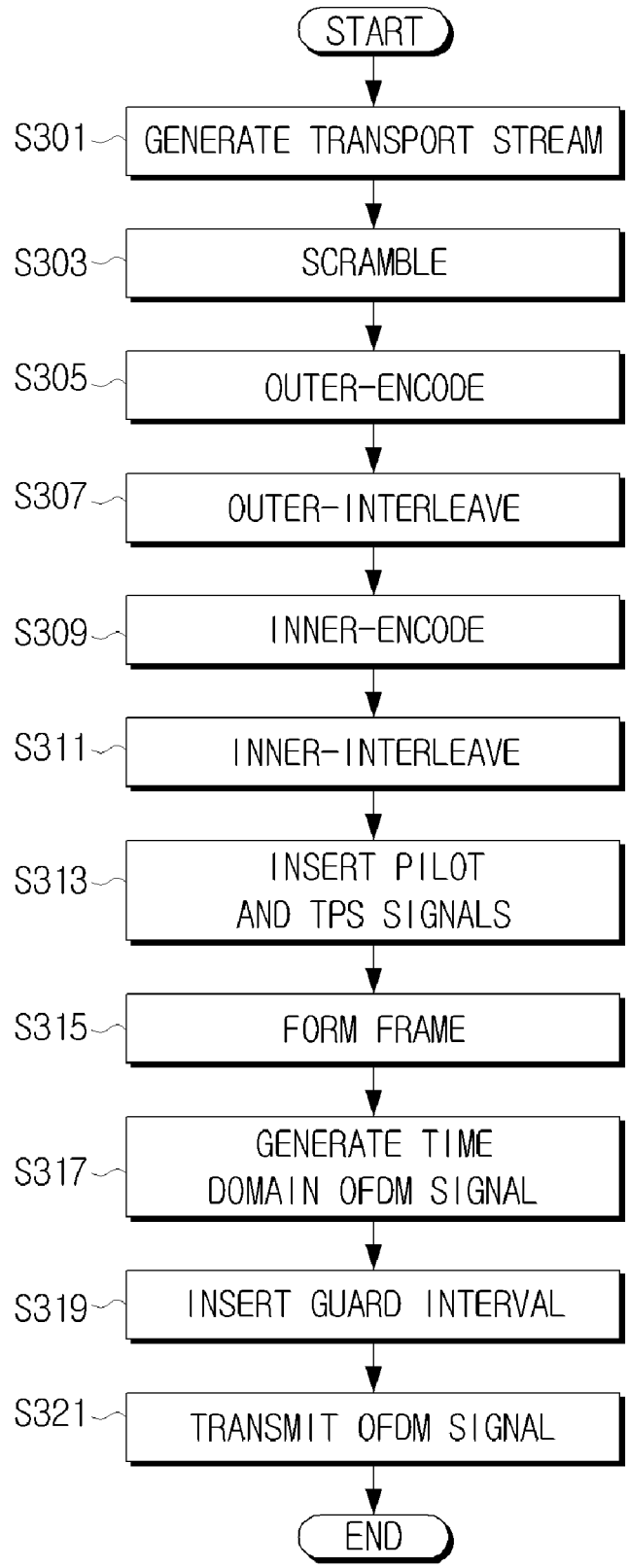
FIG. 2 is a flowchart provided to explain a method for transmitting an OFDM signal according to an exemplary embodiment of the present invention.

FIG. 2 is a flowchart provided to explain a method for transmitting an OFDM signal according to an exemplary embodiment of the present invention.

A method for transmitting an OFDM signal according to an exemplary embodiment of the present invention will be explained with reference to FIGS. 1 and 2.

The transport stream generating unit 100 generates a transport stream. Specifically, the first encoder 110, the second encoder 120, and the first MUX 130 generate an HP stream, and the third encoder 140, the fourth encoder 150, and the second MUX 160 generate an LP stream (S301).

The first scrambler 201 and the second scrambler 209 receive an HP stream and an LP stream, and scramble the respective input streams (S303).

The first outer coder 203 and the second outer coder 211 receive the scrambled HP and LP streams, and encode the respective received streams (S305).

The first outer interleaver 205 and the second outer interleaver 213 receive the outer encoded HP and LP streams, and interleave the respective received streams (S307).

The first inner coder 207 and the second inner coder 215 receive the outer-interleaved HP and LP streams, and encode the respective received streams (S309).

The inner interleaver 217 interleaves the HP and LP streams, completing the above processes, that is scrambling, outer encoding, outer interleaving, and inner encoding (S311).

The mapping unit 219 receives a pilot signal and a transmission parameter signaling (TPS) signal, and maps the signals by adding the pilot signal and the TPS signal to the transport stream output from the inner interleaver 217 (S313).

The frame adaptation unit 221 forms a frame of the transport stream including the pilot signal and the TPS signal by the mapping unit 219 (S315). The signal output from the frame adaptation unit 221 may be a frequency domain OFDM signal.

The IFT unit 223 transforms a frequency domain OFDM signal input by the frame adaptation unit 221 to a time domain OFDM signal according to one of transmission modes of 4K, 16K, and 32K (S317).

The guard interval inserting unit 225 inserts a guard interval into the transformed time domain OFDM signal according to a predetermined guard interval inserting ratio (S319).

The OFDM signal having the guard interval is converted into an analog signal by the DAC 227, and is transmitted through the transmitting unit 229 (S321).

The OFDM signal generated by performing the above processes includes more data due to the decrease of the ratio of the valid symbol interval to guard interval ratio.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

INDUSTRIAL APPLICABILITY

The present invention may be applied to various communication fields using an OFDM technique, specifically to a European digital broadcast transmission system.

The invention claimed is:

1. An orthogonal frequency division multiplexing (OFDM) signal transmission apparatus, the apparatus comprising:
    an inverse Fourier transform (IFT) unit which transforms a frequency domain OFDM signal to a time domain OFDM signal according to one of transmission modes of 4K, 16K, and 32K;
    a guard interval inserting unit which inserts a guard interval into the transformed time domain OFDM signal according to a predetermined guard interval inserting rate; and
    a transmitting unit which transmits the OFDM signal having the guard interval,
    wherein the IFT unit performs an IFT on the frequency domain OFDM signal using an IFT coefficient and processes a frequency domain OFDM signal using a predetermined number of carriers, according to one of the transmission modes of 4K, 16K, and 32K, and
    wherein the IFT coefficient and the predetermined number of carriers are different from each other.

2. The apparatus of claim 1, wherein if the transmission mode is 4K, the IFT coefficient is 4*1024, if the transmission mode is 16K, the IFT coefficient is 16*1024, and if the transmission mode is 32K, the IFT coefficient is 32*1024.

3. The apparatus of claim 1, wherein the guard interval inserting rate is one of ¼, ⅛, 1/16, 1/32, and 1/64.

4. The apparatus of claim 1, wherein if the transmission mode is 4K, the IFT unit processes a frequency domain OFDM signal using 1705*2 carriers, if the transmission mode is 16K, the IFT unit processes a frequency domain OFDM signal using 6817*2 carriers, and if the transmission mode is 32K, the IFT unit processes a frequency domain OFDM signal using 6817*4 carriers.

5. The apparatus of claim 1, wherein if a bandwidth of 8 MHz is used, and the transmission mode is 4K, the IFT unit processes the frequency domain OFDM signal so that the symbol duration is 224*2 μs, if a bandwidth of 8 MHz is used, and the transmission mode is 16K, the IFT unit processes the frequency domain OFDM signal so that the symbol duration is 896*2 μs, and if a bandwidth of 8 MHz is used, and the transmission mode is 32K, the IFT unit processes the frequency domain OFDM signal so that the symbol duration is 896*4 μs.

6. The apparatus of claim 1, wherein if a bandwidth of 6 MHz is used, and the transmission mode is 4K, the IFT unit processes the frequency domain OFDM signal so that the symbol duration is 298.667*2 µs, if a bandwidth of 6 MHz is used, and the transmission mode is 16K, the IFT unit processes the frequency domain OFDM signal so that the symbol duration is 1194.667*2 µs, and if a bandwidth of 6 MHz is used, and the transmission mode is 32K, the IFT unit processes the frequency domain OFDM signal so that the symbol duration is 1194.667*4 µs.

7. The apparatus of claim 1, wherein if a bandwidth of 7 MHz is used, and the transmission mode is 4K, the IFT unit processes the frequency domain OFDM signal so that the symbol duration is 256*2 µs, if a bandwidth of 7 MHz is used, and the transmission mode is 16K, the IFT unit processes the frequency domain OFDM signal so that the symbol duration is 1024*2 µs, and if a bandwidth of 7 MHz is used, and the transmission mode is 32K, the IFT unit processes the frequency domain OFDM signal so that the symbol duration is 1024*4 µs.

8. The apparatus of claim 1, further comprising:
a digital-to-analog converter (DAC) which converts an OFDM signal having the guard interval output from the guard interval inserting unit into an analog signal.

9. A method for transmitting an orthogonal frequency division multiplexing (OFDM) signal, the method comprising:
transforming a frequency domain OFDM signal to a time domain OFDM signal according to one of transmission modes of 4K, 16K, and 32K;
inserting a guard interval into the transformed time domain OFDM signal according to a predetermined guard interval inserting rate; and
transmitting the OFDM signal having the guard interval, wherein the transforming performs an IFT on the frequency domain OFDM signal using an IFT coefficient and processes a frequency domain OFDM signal using a predetermined number of carriers, according to one of the transmission modes of 4K, 16K, and 32K, and
wherein the IFT coefficient and the predetermined number of carriers are different from each other.

10. The method of claim 9, wherein if the transmission mode is 4K, the IFT coefficient is 4*1024, if the transmission mode is 16K, the IFT coefficient is 16*1024, and if the transmission mode is 32K, the IFT coefficient is 32*1024.

11. The method of claim 9, wherein the guard interval inserting rate is one of ¼, ⅛, 1/16, 1/32, and 1/64.

12. The method of claim 9, wherein if the transmission mode is 4K, the transforming comprises processing a frequency domain OFDM signal using 1705*2 carriers, if the transmission mode is 16K, the transforming comprises processing a frequency domain OFDM signal using 6817*2 carriers, and if the transmission mode is 32K, the transforming comprises processing a frequency domain OFDM signal using 6817*4 carriers.

13. The method of claim 9, wherein if a bandwidth of 8 MHz is used, and the transmission mode is 4K, the transforming comprises processing the frequency domain OFDM signal so that the symbol duration is 224*2 µs, if a bandwidth of 8 MHz is used, and the transmission mode is 16K, the transforming comprises processing the frequency domain OFDM signal so that the symbol duration is 896*2 µs, and if a bandwidth of 8 MHz is used, and the transmission mode is 32K, the transforming comprises processing the frequency domain OFDM signal so that the symbol duration is 896*4 µs.

14. The method of claim 9, wherein if a bandwidth of 6 MHz is used, and the transmission mode is 4K, the transforming comprises processing the frequency domain OFDM signal so that the symbol duration is 298.667*2 µs, if a bandwidth of 6 MHz is used, and the transmission mode is 16K, the transforming comprises processing the frequency domain OFDM signal so that the symbol duration is 1194.667*2 µs, and if a bandwidth of 6 MHz is used, and the transmission mode is 32K, the transforming comprises processing the frequency domain OFDM signal so that the symbol duration is 1194.667*4 µs.

15. The method of claim 9, wherein if a bandwidth of 7 MHz is used, and the transmission mode is 4K, the transforming comprises processing the frequency domain OFDM signal so that the symbol duration is 256*2 µs, if a bandwidth of 7 MHz is used, and the transmission mode is 16K, the transforming comprises processing the frequency domain OFDM signal so that the symbol duration is 1024*2 µs, and if a bandwidth of 7 MHz is used, and the transmission mode is 32K, the transforming comprises processing the frequency domain OFDM signal so that the symbol duration is 1024*4 µs.

16. The method of claim 9, further comprising:
converting an OFDM signal having the guard interval output from the guard interval inserting unit into an analog signal.

* * * * *